(12) United States Patent
Oner et al.

(10) Patent No.: US 9,281,743 B1
(45) Date of Patent: Mar. 8, 2016

(54) CHARGE PUMP POWER SUPPLY WITH OUTPUT VOLTAGE SENSING USING RESIDUAL CHARGE ON A FLYING CAPACITOR

(71) Applicant: Texas Instruments Incorporated, Dallas, TX (US)

(72) Inventors: Hakan Oner, San Jose, CA (US); Richard D. Nicholson, Aptos, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/587,813

(22) Filed: Dec. 31, 2014

Related U.S. Application Data

(60) Provisional application No. 62/046,136, filed on Sep. 4, 2014.

(51) Int. Cl.
*H02M 3/07* (2006.01)

(52) U.S. Cl.
CPC .......... *H02M 3/07* (2013.01); *H02M 2003/077* (2013.01)

(58) Field of Classification Search
CPC .. H02M 3/07; H02M 2003/077; H02M 3/073
See application file for complete search history.

(56) References Cited

U.S. PATENT DOCUMENTS

| | | | | |
|---|---|---|---|---|
| 7,888,989 B2 * | 2/2011 | Lin | ........................ | H02M 3/07 327/535 |
| 8,242,833 B2 * | 8/2012 | Lin | ........................ | H02M 3/07 327/535 |
| 8,310,299 B2 * | 11/2012 | Lin | ........................ | H02M 3/07 327/535 |
| 2014/0340158 A1 * | 11/2014 | Thandri | .................. | H03F 1/025 330/297 |

* cited by examiner

*Primary Examiner* — Jung Kim
(74) *Attorney, Agent, or Firm* — Andy Viger; Frank D. Cimino (57) ABSTRACT

A regulated charge pump power supply is implemented with a QP regulation loop providing QP clocking to control pumping operation based on sensing output voltage using residual charge on a flying capacitor Cfly. Cfly is used not only in normal charge pumping operation as an active charge shuttle element, but also to determine/measure output voltage VOUT. Voltage sensing using measured residual charge on Cfly is accomplished by introducing a sample phase into the normal charge pumping operation—after the pump phase and before the charge phase. In the sample phase, VOUT is determined (sampled) based on the residual charge on Cfly corresponding to (Vsense=VOUT−VIN). During the sample phase, the Cfly bottom plate is connected to ground, and the Cfly top plate is sampled (such as with a sense capacitor), with the sample phase completed prior to initiating a charge phase (by connecting the Cfly top plate to VIN).

15 Claims, 9 Drawing Sheets

CHARGE PUMP POWER SUPPLY WITH OUTPUT VOLTAGE SENSING USING RESIDUAL CHARGE ON A FLYING CAPACITOR

CROSS-REFERENCE TO RELATED APPLICATIONS

Priority is claimed under USC§119(e) to U.S. Provisional Application 62/046,136 (filed Sep. 4, 2014).

BACKGROUND

1. Technical Field

This Patent Document relates generally to charge pumps that supply regulated output voltage VOUT, including sensing VOUT.

2. Related Art

A charge pump circuit uses an input voltage to generate an output voltage that is higher than the input voltage. For example, a charge pump voltage doubler supplies output voltage 2x the input voltage. Charge pumps can be operated within an actively controlled control loop to regulate output voltage within a target output voltage band.

The current consumption and efficiency of the charge pump is a function of the ratio of the time that the charge pump is disabled to that of the charge pump is enabled, and the current consumption of the output voltage sense network which provides the feedback to the active control loop. The ratio of the time that the charge pump is disabled to that of the charge pump is enabled is a function of the regulation band, the external output load, the losses of the charge pump, the internal output load (sense network & leakages) and the charge pump operating frequency.

If the sense/feedback network draws significant current when the charge pump is disabled, more frequent enabling is required, resulting in an efficiency loss. For example, in light current-load conditions (such as driving a capacitive load), the total power consumption of a regulated charge pump can become dominated by pump output loading due to the regulator feedback/sense network.

BRIEF SUMMARY

This Brief Summary is provided as a general introduction to the Disclosure provided by the Detailed Description and Figures, summarizing some aspects and features of the Disclosure. It is not a complete overview of the Disclosure, and should not be interpreted as identifying key elements or features of the invention, or otherwise characterizing or delimiting the scope of the invention disclosed in this Patent Document.

The Disclosure is directed generally to the problem of regulating a charge pump power supply based on sensing output voltage. The Disclosure describes apparatus and methods suitable for supplying a regulated voltage using a charge pump power supply, including voltage sensing using the residual charge on a flying capacitor.

According to aspects of the Disclosure, a methodology output voltage sensing using the residual charge on a flying capacitor is useable in a charge pump power supply including at least one flying capacitor Cfly, with a Cfly top plate and a Cfly bottom plate, and including a QP switching network configured for controlled switching of Cfly in successive pump and charge phases, where, in a pump phase, Cfly is coupled between VOUT and VIN, and in a charge phase, Cfly is coupled between VIN and a ground potential GND.

The methodology for residual-charge voltage sensing includes: (a) generating, based on a Vsense voltage signal corresponding to VOUT, a clock signal QPclk that controls the QP switching network to operate the charge pump power supply with non-overlapping charge and pump phases, and generate a regulated VOUT; and (b) generating the Vsense voltage signal corresponding to VOUT in a sample phase occurring after the pump phase and before the charge phase, the sample phase including: (1) connecting the Cfly bottom plate to GND, and (2) sampling the voltage on the Cfly top plate as the Vsense voltage corresponding to (Vsense=VOUT−VIN).

In a disclosed example, the Vsense voltage signal is generated in a Vsense circuit that includes: (a) a sense capacitor Csns; and (b) a sample transistor coupled between Csns and the Cfly top plate. The sample transistor is controlled by a sample signal derived from QPclk that switches the sample transistor on to couple the Cfly top plate to Csns after the Cfly bottom plate is coupled to GND, such that the Vsense voltage is on Csns.

Other aspects and features of the invention claimed in this Patent Document will be apparent to those skilled in the art from the following Disclosure.

DETAILED DESCRIPTION

This Description and the Figures constitute a Disclosure of example embodiments and applications that illustrate a charge pump power supply with voltage sensing using the residual charge on a flying capacitor, which will be referred to in this Description as residual-charge voltage sensing. As used in this Description, ground or GND refers to circuit ground.

In brief overview, a regulated charge pump power supply is implemented with a QP regulation loop providing QP clocking to control pumping operation based on sensing output voltage using residual charge on a flying capacitor. The flying capacitor is used not only in normal charge pumping operation as an active charge shuttle element, but also to determine/measure output voltage VOUT. Voltage sensing using measured residual charge on the flying capacitor is accomplished by introducing a sample phase into the normal charge pumping operation—after the pump phase and before the charge phase. In the sample phase, VOUT is determined (sampled) based on the residual charge on the flying capacitor corresponding to (Vsense=VOUT−VIN). During the sample phase, the flying capacitor bottom plate is connected to ground, and the top plate is sampled (such as with a sense capacitor), with the sample phase completed prior to initiating a charge phase (by connecting the top plate of the flying capacitor to VIN).

In example embodiments, a charge pump power supply circuit is configured to supply a regulated output voltage VOUT based on an input voltage VIN, including a charge pump circuit includes at least one flying capacitor Cfly, including a Cfly top plate and a Cfly bottom plate, and a QP switching network configured for controlled switching of Cfly in successive phases: a pump phase with Cfly coupled between VOUT and VIN, and a charge phase with Cfly coupled between VIN and GND.

QP regulation loop circuitry is configured to regulate VOUT by controlling the QP switching network, and includes: (a) Vsense circuitry coupled to the QP switching network, and configured to sense VOUT and provide a corresponding Vsense voltage signal; and (b) QP clocking circuitry responsive to the Vsense signal corresponding to VOUT to supply a clock signal QPclk that controls the QP switching network to operate the charge pump circuit with non-overlapping charge and pump phases, and generate a regulated VOUT. The Vsense circuitry and the QP switching network are configured for cooperative operation in a sample phase occurring after the pump phase and before the charge phase, the sample phase including: (a) connecting the Cfly bottom plate to GND, and (b) sampling the voltage on the Cfly top plate as the Vsense voltage corresponding to (Vsense=VOUT−VIN).

In example embodiments, the Vsense circuitry is implemented with a sense capacitor Csns; and a sample transistor coupled between Csns and the Cfly top plate. The sample transistor is controlled by a sample signal derived from QPclk that switches the sample transistor on to couple the Cfly top plate to Csns after the Cfly bottom plate is coupled to GND, such that the Vsense voltage is on Csns.

In example embodiments, the charge pump circuit is configured with a dual-phase complementary differential topology, including complementary differential charge pump stages, each including dual differential flying capacitors Cfly, and an associated complementary differential QP switch network. The Vsense circuitry is configured to sample the complementary dual flying capacitors once in each QP clock period, so that the average of the samples is the Vsense sense voltage.

Figure 1:
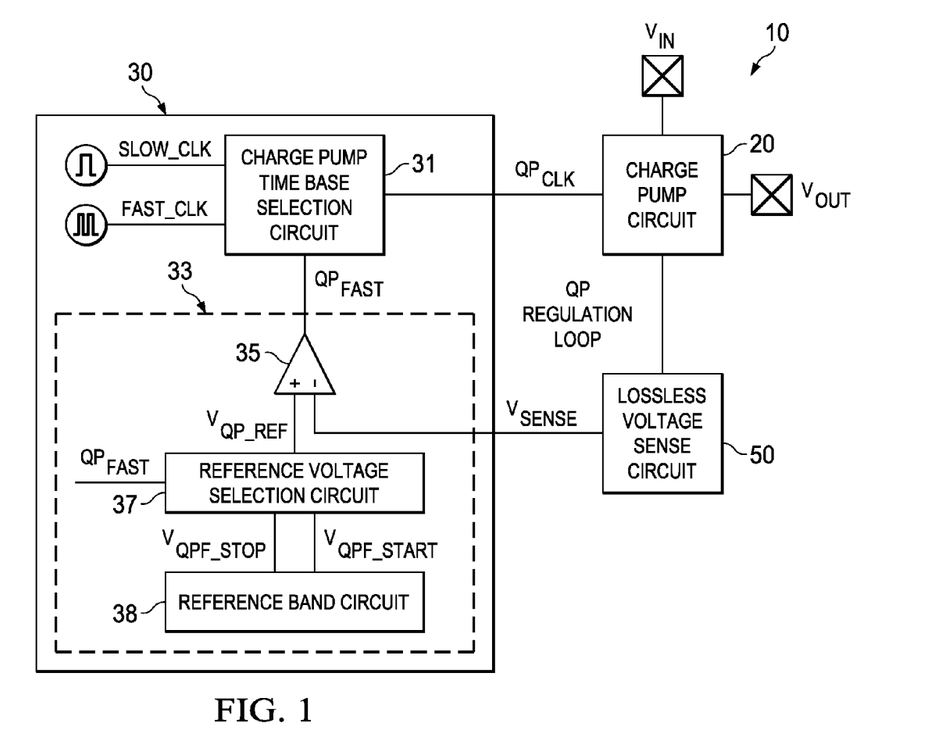
FIG. 1 illustrates an example functional embodiment of a charge pump power supply configured for residual-charge voltage sensing, including a charge pump clocked by a QPclk circuit 30, and a QP regulation loop that includes a lossless voltage sense (Vsense) circuit that implements residual-charge voltage sensing.

FIG. 1 illustrates an example functional embodiment of a charge pump power supply 10 configured for residual-charge voltage sensing based on sampling the residual charge on the flying capacitor(s) between pump and charge phases (when flying capacitor voltage corresponds to VOUT−VIN). Charge pump power supply 10 includes a charge pump 20 clocked by a QPclk circuit 30, and a lossless voltage sense (Vsense) circuit 50.

Charge pump 20 represents any multi-stage charge pump that supplies a regulated VOUT using non-overlapping multi-phase QP clocking that controls pumping operation based on sensed VOUT. FIGS. 5A-5C and 6A-6B illustrate an example embodiment of a dual-phase complementary differential charge pump topology, including residual charge voltage sensing (Vsense circuit 50). However, residual charge voltage sensing as implemented in the example embodiments is suitable for, and adaptable to, any multi-stage, multi-phase charge pump topology.

QPclk 30 and Vsense 50 establish a QP (voltage) regulation loop for charge pump 20. The QP regulation loop controls QPclk generation by QPclk circuit 30 based on a Vsense signal from Vsense 50. Vsense 50 implements residual-charge voltage sensing, so that Vsense corresponds to VOUT (Vsense=VOUT−VIN).

Charge pump QPclk circuit 30 generates a QPclk supplied to charge pump 20 QP regulation loop that includes a QP. Charge pump 20 is clocked by QPclk from a QPclk circuit 30, controlled by the QP regulation loop based on residual-charge voltage sensing provided by Vsense circuit 50.

Vsense circuit 50 measures charge pump output voltage Vout based on the residual charge on the charge pump flying capacitor(s), and provides a feedback Vsense signal to QPclk circuit 30.

Figure 2:
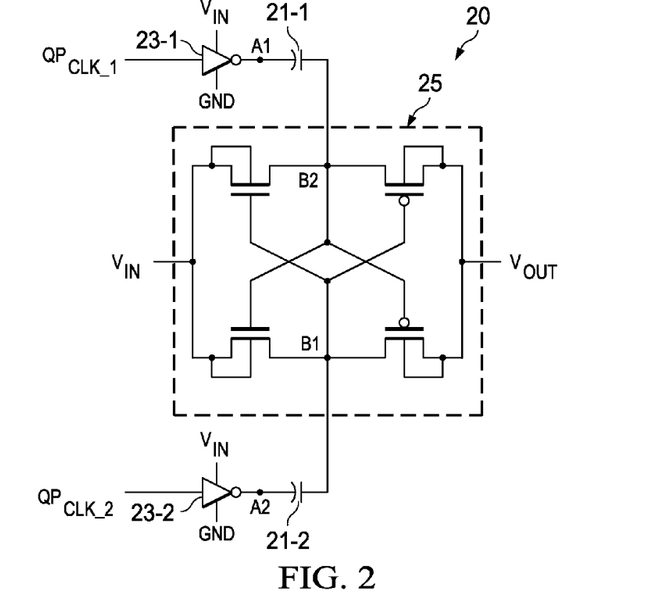
FIG. 2 illustrates an example embodiment of a differential charge pump, including dual flying capacitors, and a VIN/VOUT cross-coupling network.

FIG. 2 illustrates an example embodiment of a differential charge pump 20, including dual flying capacitors 21_1 and 21_2, and a VIN/VOUT cross-coupling network 25. The example QP regulation loop operates as a voltage doubler, generating VOUT=2*VIN.

According to conventional charge pump operation, dual-phase clocks QPCLK_1 and QPCLK_2 switch the bottom plates of respective flying capacitors 21_1 and 21_2 between VIN and GND (pump/charge) through respective inverters 23_1 and 23_2, and cross-coupling network 25 switches the top plates between respectively VOUT and VIN (pump/charge).

Referring to FIG. 1, for the example embodiment, based on Vsense from the QP regulation loop, QPclk circuit 30 selects between FAST_clk and SLOW_clk for output to charge pump 20 as QPclk. QPclk circuit 30 switches between FAST and SLOW clock domains based on the Vsense feedback/sense signal from Vsense circuit 50. Charge pump 20 is switched ON/OFF, between QPclk=FAST_clk and QPclk=SLOW_clk, by the QP regulation loop, with FAST/SLOW durations (charge pump duty cycle) adjusted dynamically to minimize/optimize power consumption for charge pump.

QPclk circuit 30 includes a time base generation circuit 31 that selects FAST_clk or SLOW_clk based on a selection signal $QP_{FAST}$ from a QP_FAST generation circuit 33 (if $QP_{FAST}$ is asserted, time base generation circuit 31 selects FAST_clk). $QP_{FAST}$ generation circuit 33 generates $QP_{FAST}$ based on Vsense from Vsense circuit 50, and programmable reference voltages $V_{QPF\_START}$ and $V_{QPF\_STOP}$, which establish a VOUT regulation band. $V_{QPF\_START}$ corresponds to starting FAST_clk, and $V_{QPF\_STOP}$ corresponds to stopping FAST_clk and starting SLOW_clk.

$QP_{FAST}$ generation circuit 33 includes a comparator 35 that generates $QP_{FAST}$ based on a comparison of the Vsense signal and a reference voltage $V_{QP\_REF}$. $V_{QP\_REF}$ is generated by a reference voltage selection circuit 37, which selects between the $V_{QPF\_START}$ and $V_{QPF\_STOP}$ reference band voltages generated by a reference band circuit 38. If Vsense is below $V_{QPF\_START}$, then $QP_{FAST}$ will be asserted, and FAST_clk will be selected by timebase generation circuit 31 as QPclk—if Vsense is above $V_{QPF\_STOP}$, then $QP_{FAST}$ will be de-asserted, and SLOW_clk will be selected.

Figure 3A:
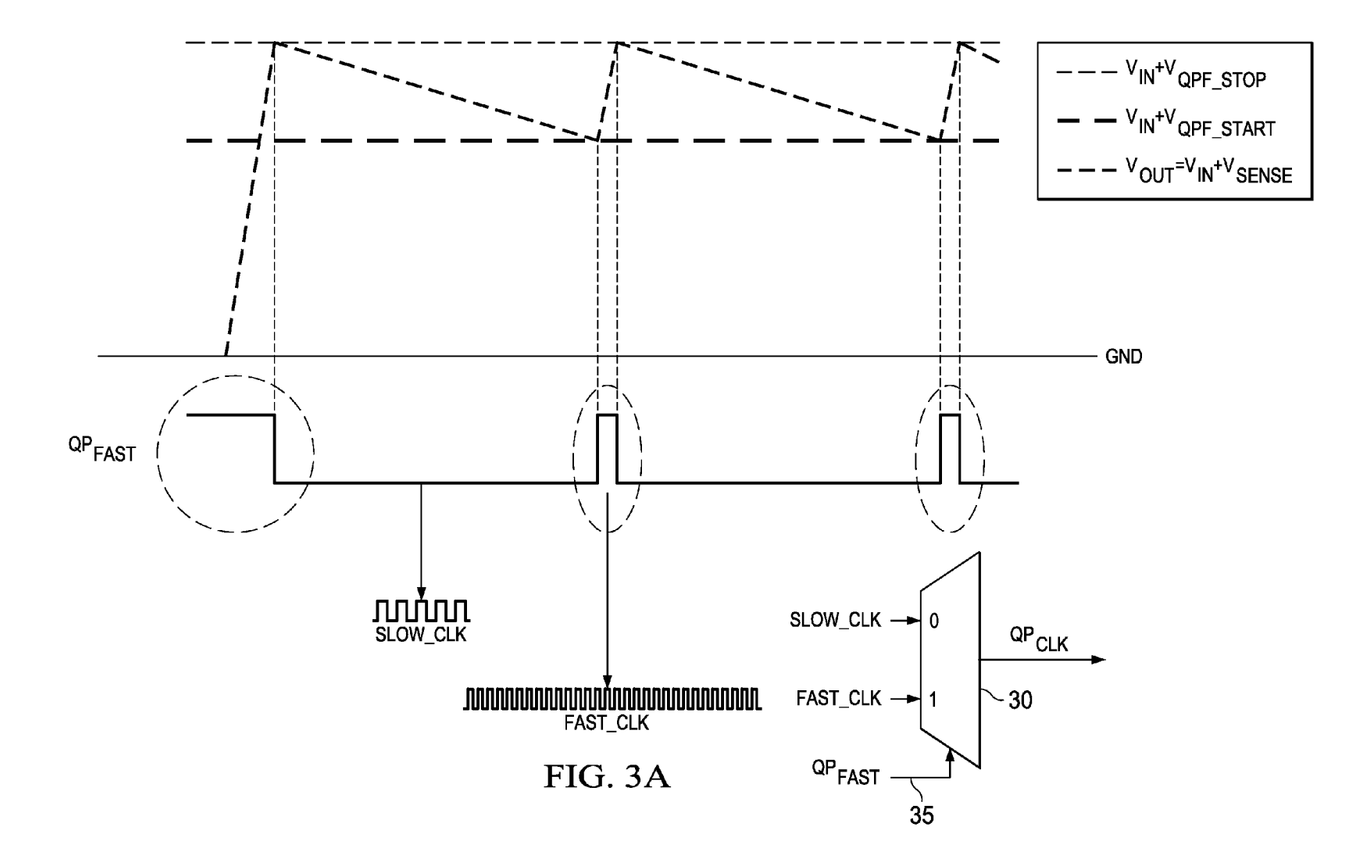
FIGS. 3A and 3B illustrate charge pump operation based on the example QP regulation loop with QP SLOW_clk and FAST_clk: (3A) illustrates charge pump output voltage regulation with QP SLOW/FAST_clk based on Vsense; and (3B) illustrates Vsense voltage variation within regulation band limits established $V_{QP\_START}$ and $V_{QP\_STOP}$.
Figure 3B:
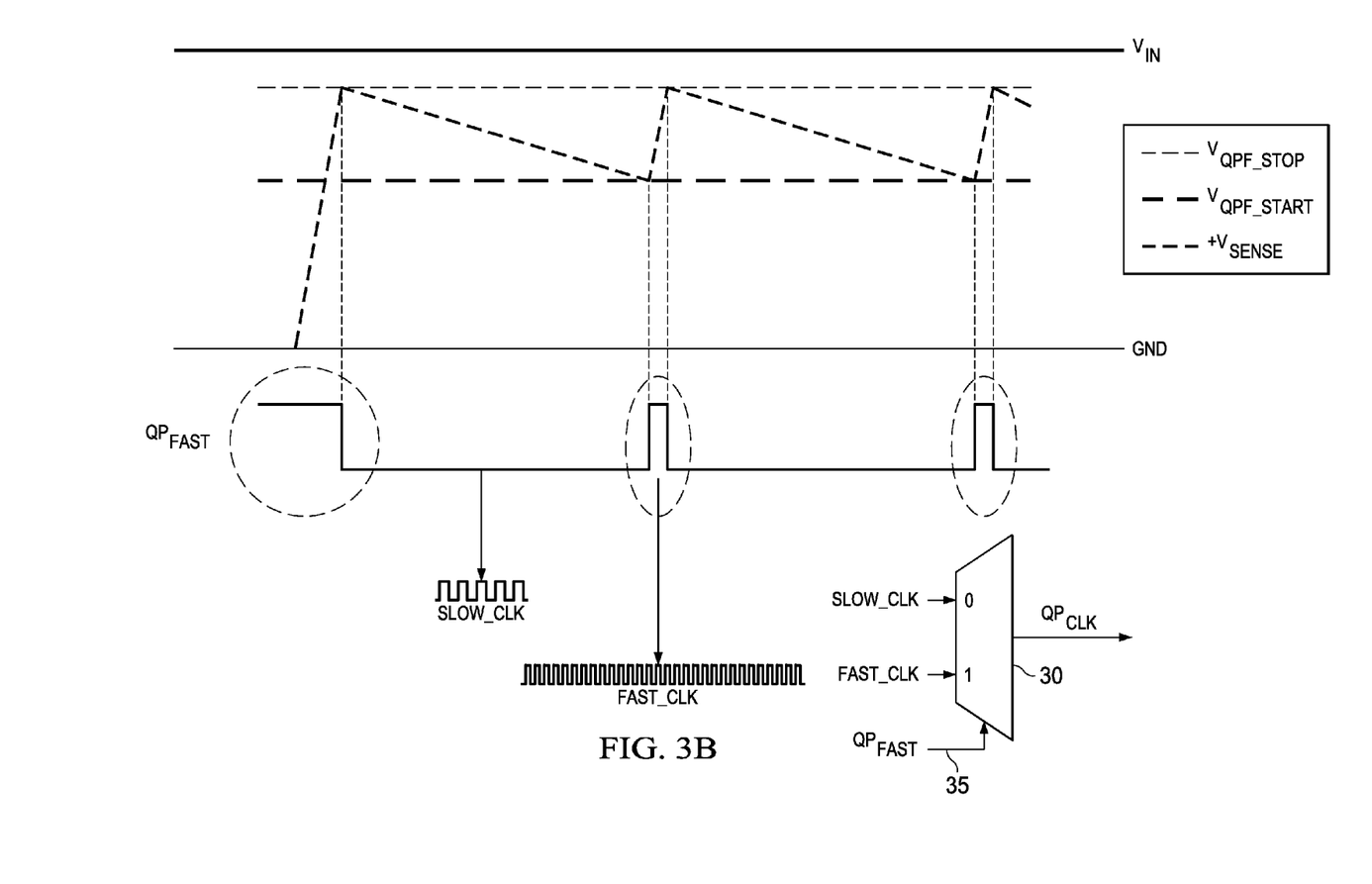

FIGS. 3A and 3B illustrate charge pump operation based on the example QP clock regulation with QPclk=SLOW_clk and QPclk=FAST_clk. FIG. 3A illustrates charge pump output voltage regulation based on Vsense. FIG. 3B illustrates Vsense voltage variation within regulation band limits established $V_{QPF\_START}$ and $V_{QPF\_STOP}$.

Charge pump ON operation is clocked by FAST_clk, corresponding to "burst" mode pumping. The QP regulation loop keeps charge pump 20 operating in this mode when the sensed voltage Vsense drops below the $V_{QPF\_START}$ reference voltage (starting FAST_clk), until it rises above the $V_{QPF\_STOP}$ reference voltage (stopping FAST_clk).

Charge pump OFF operation is clocked by SLOW_clk, corresponding to a "maintain" operating mode. The QP regulation loop keeps charge pump 20 operating in this mode when the sensed voltage Vsense rises above the $V_{QPF\_STOP}$ (switching from FAST_clk to SLOW_clk) until it drops below the $V_{QPF\_START}$ (switching from SLOW_clk to FAST_clk).

The voltage added to the $V_{IN}$ by the charge pump is regulated by accurate measurement of the $V_{SENSE}$ voltage, and the selection of the $V_{QPF\_START}$ and $V_{QPF\_STOP}$ reference band voltages. The added portion is regulated in a band limited by the $V_{QPF\_START}$ and $V_{QPF\_STOP}$ boundaries.

$V_{OUT}$ ramps up to $V_{IN}$, and then $V_{OUT}$ is regulated to $$V_{OUT}=V_{IN}+V_{ADJ}$$

where $V_{ADJ}=(V_{QPF\_START}+V_{QPF\_STOP})/2$.

The difference ($V_{OUT}-V_{IN}$) between the charge pump output voltage $V_{OUT}$ and the charge pump input voltage $V_{IN}$ is the sense voltage $V_{SENSE}$, which is used to regulate the output voltage between the $V_{IN}+V_{QPF\_START}$ and $V_{IN}+V_{QPF\_STOP}$ limits. Charge pump current consumption is dynamically adjusted and minimized by switching the charge pump QPclk between the FAST and SLOW clock domains based on the $V_{SENSE}$ voltage within QP regulation limits $V_{QPF\_START}$ and $V_{QPF\_STOP}$.

Delta voltage between the $V_{QPF\_STOP}$ and $V_{QPF\_START}$ determines the regulation band and these low/high end of the limits need to be selected per specific design. The reference/regulation band voltages $V_{QPF\_START}$ and $V_{QPF\_STOP}$ are a design choice, and can be generated in a variety of methods, referenced to $V_{IN}$.

Figure 4A:
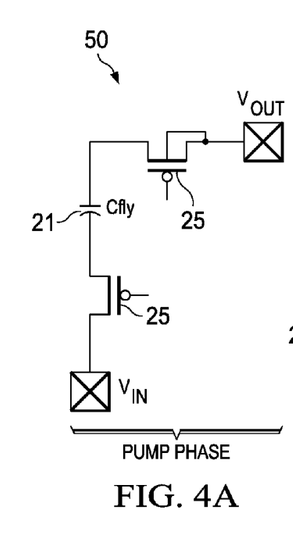
FIGS. 4A, 4B, 4C functionally illustrate the operation of residual-charge voltage sensing to measure output voltage VOUT, including using a Vsense sample phase (FIG. 4B) between pump (FIG. 4A) and charge (FIG. 4C) phases to sample based on the residual charge on the charge pump flying capacitor(s) corresponding to (Vsense=VOUT−VIN).
Figure 4B:
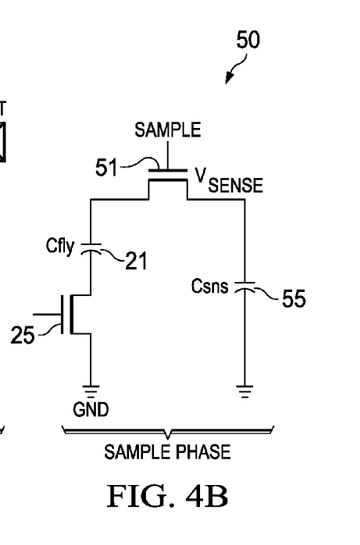
Figure 4C:
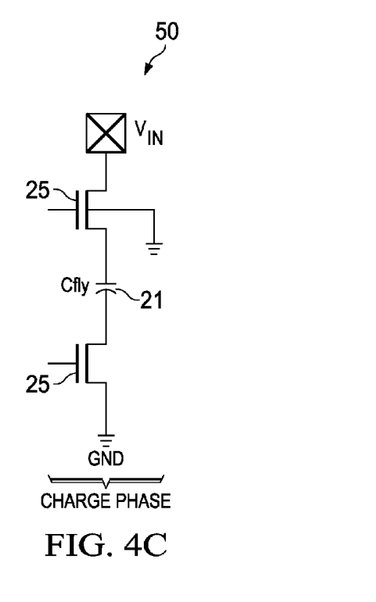

FIG. 4 functionally illustrates the operation of Vsense circuit 50 in implementing residual-charge voltage sensing to measure output voltage VOUT, including using a Vsense sample phase (4B) between pump phase (4A) and charge phase (4C) to sample VOUT based on the residual charge on the charge pump flying capacitor(s) corresponding to (Vsense=VOUT−VIN). Vsense circuit 50 includes a sample circuit represented by transistor 51, and a sense capacitor Csns. Vsense circuit 50 is coupled to the charge pump (FIG. 1, 20) represented in FIG. 4 by flying capacitor Cfly 21 and transistors 25.

Vsense circuit 50 operates by introducing a sample phase (4B) between the normal pump phase (4A) and charge phase (4C) of the charge pump. Vsense operation relies on sampling the charge on the flying capacitor Cfly 21 at a time window in which the voltage across the capacitor corresponds to the difference between output voltage VOUT and the input voltage VIN.

During a pump phase (4A), Cfly is connected between VOUT and VIN, so that at the end of the pump phase, the voltage across Cfly 21 corresponds to (VOUT−VIN). During the charge phase (4C), the bottom plate of Cfly 21 is disconnected from VIN and connected to GND, and the top plate is disconnected from VOUT and connected to VIN, re-charging Cfly.

During the Vsense sample phase (4B), the Cfly bottom plate is connected to ground, and the Vsense circuit samples the Cfly top plate, functionally represented by connecting Csns 55 across Cfly 21 through transistor 51. This sample phase (4B) is completed prior to initiating the charge phase (4C) by connecting the Cfly top plate to VIN.

The Csns voltage is output as the Vsense feedback/sense voltage from Vsense circuit 50. This Vsense voltage corresponds to the residual voltage on the flying capacitor Cfly, sampled to Csns prior to initiation of the charge phase, so that Vsense=VOUT−VIN.

Figure 5A:
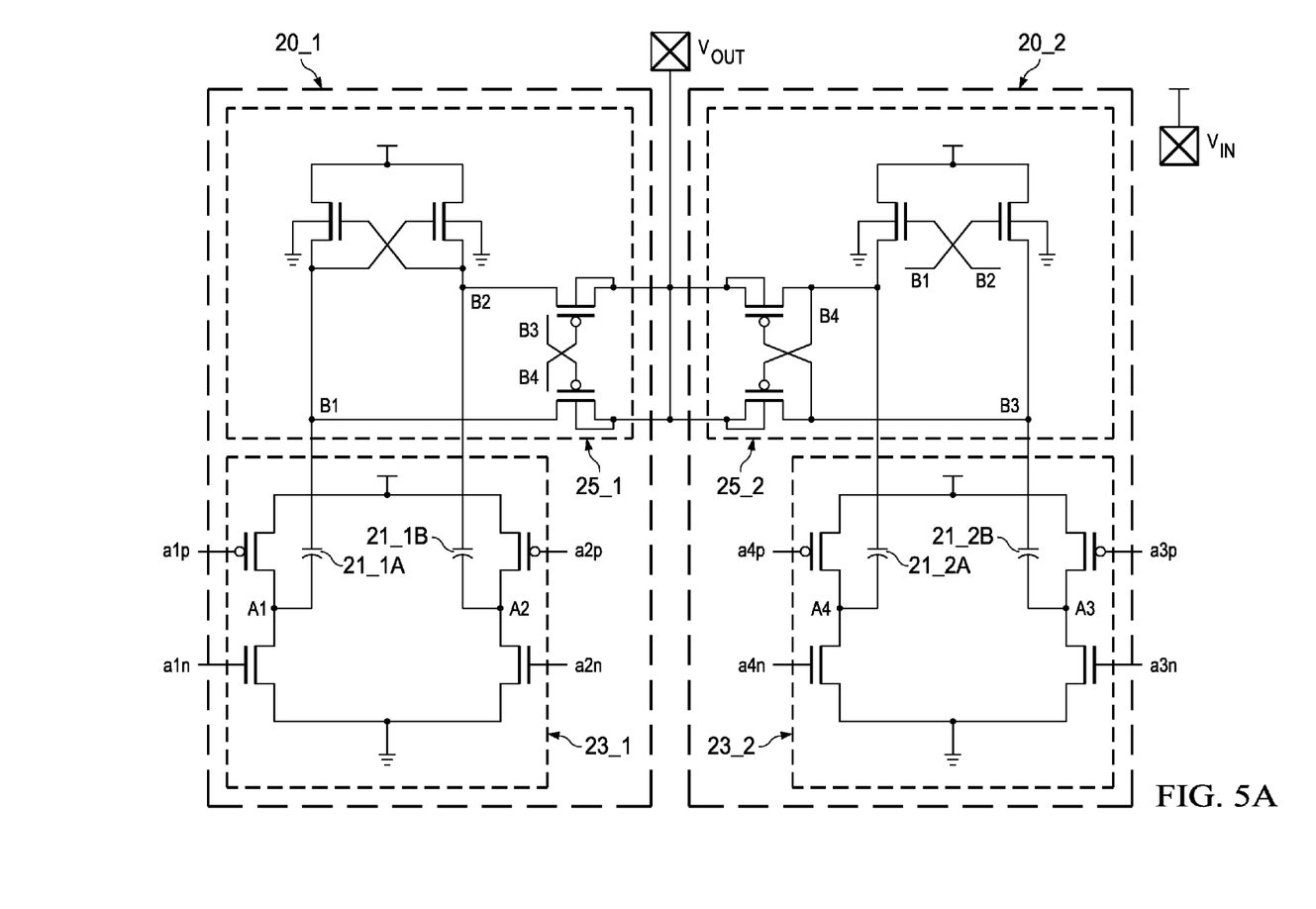
FIG. 5A illustrates an example embodiment of a charge pump implemented in a dual-phase complementary differential topology, including complementary differential charge pump stages.

FIG. 5A illustrates an example embodiment of a charge pump 20 implemented in a dual-phase complementary differential topology. Charge pump 20 includes complementary differential charge pump stages 20_1 and 20_2.

Differential charge pump stage 20_1 includes dual flying capacitors 21_1A and 21_1B. A dual phase clocked switching network 23_1 (a1p/a1n and a2p/a2n) switches the bottom plates of flying capacitors 21_1A/1B between VIN and GND (pump/charge). PMOS and NMOS cross-coupling switch networks 25_1 switch the flying capacitor top plates between VOUT and VIN (pump/charge). Clocked switching network 23_1 and cross-coupling switch networks 25_1 can be referred to collectively as a QP switching network.

Figure 5B:
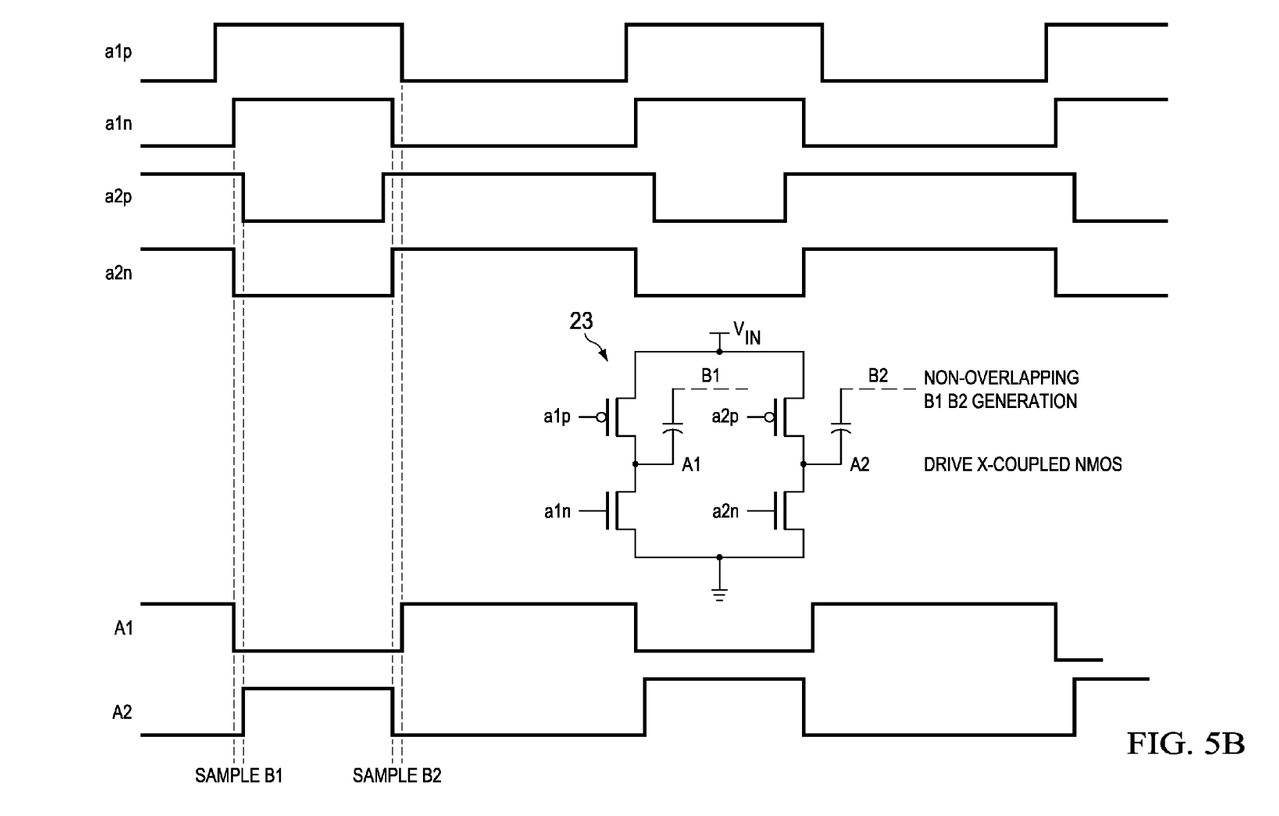
FIGS. 5B and 5C provide, for the example dual-phase complementary differential charge pump of FIG. 5A, example timing diagrams for controlling the flying capacitors in both complementary differential stages: (5B) provides example dual-phase clock signals a1p/a1n and a2p/a2n that switch the bottom plates of the flying capacitors between VIN and GND, and generate non-overlapping B1 and B2 drive for the cross-coupled NMOS that couple the top plates of flying capacitors to VOUT; and (5C) provides example dual phase clock signals a3p/a3n and a4p/a4n that switch flying capacitors between VIN and GND, and drive overlapping B3 and B4 signals for the cross-coupled PMOS that couple the top plates of flying capacitors to VOUT.
Figure 5C:
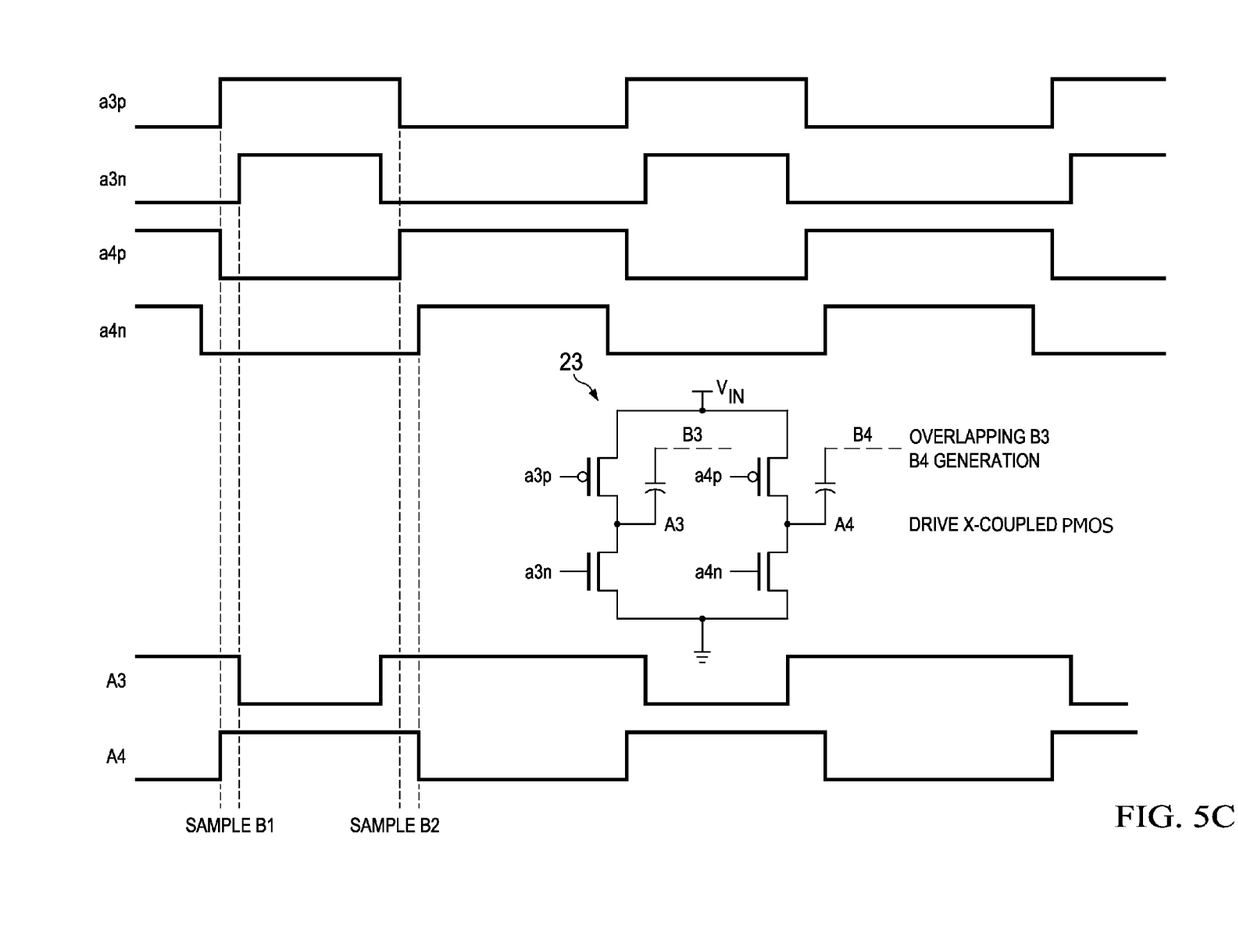

FIGS. 5B and 5C provide example clocking/timing diagrams for the clocked switching networks 23_1 and 23_2 in the complementary differential stages 20_1 and 20_2.

FIG. 5B illustrates example clocking for switching network 23_1 in charge pump stage 20_1. Dual phase clock signals a1p/a1n and a2p/a2n switch the bottom plate of flying capacitors 21_1A and 21_1B between VIN and GND, and generate non-overlapping drive B1 and B2 for the cross-coupled NMOS that switch the top plates of flying capacitors 21_1A/1B (and 21_2A/2B in differential stage 20_2) between VOUT and VIN.

FIG. 5C illustrates example clocking for switching network 23_2 in charge pump stage 20_2. Dual phase clock signals a3p/a3n and a4p/a4n switch the bottom plate of flying capacitors 21_2A and 21_2B between VIN and GND, and generate overlapping B3 and B4 signals for the cross-coupled PMOS that couple the top plates of flying capacitors 21_2A/2B (and 21_1A/1B in charge pump stage 20_1) to VOUT.

Waveforms A1/A2 in FIG. 5B and A3/A4 in FIG. 5C illustrate bottom plate switching for flying capacitors 21_1A/1B and 21_2A/2B. As described further in connection with FIGS. 6A/6B, this switching operation defines respective sample periods Sample B1 and Sample B2 during the Vsense sample phase: (a) during Sample B1, the bottom plate of flying capacitor 21_1A is at GND, and the top plate (B1) is sampled prior to switching the top plate to VIN to initiate a charge phase; and (b) during Sample B2, the bottom plate of flying capacitor 21_1B is at GND, and the top plate (B2) is sampled prior to switching the top plate to VIN to initiate a charge phase.

Figure 6A:
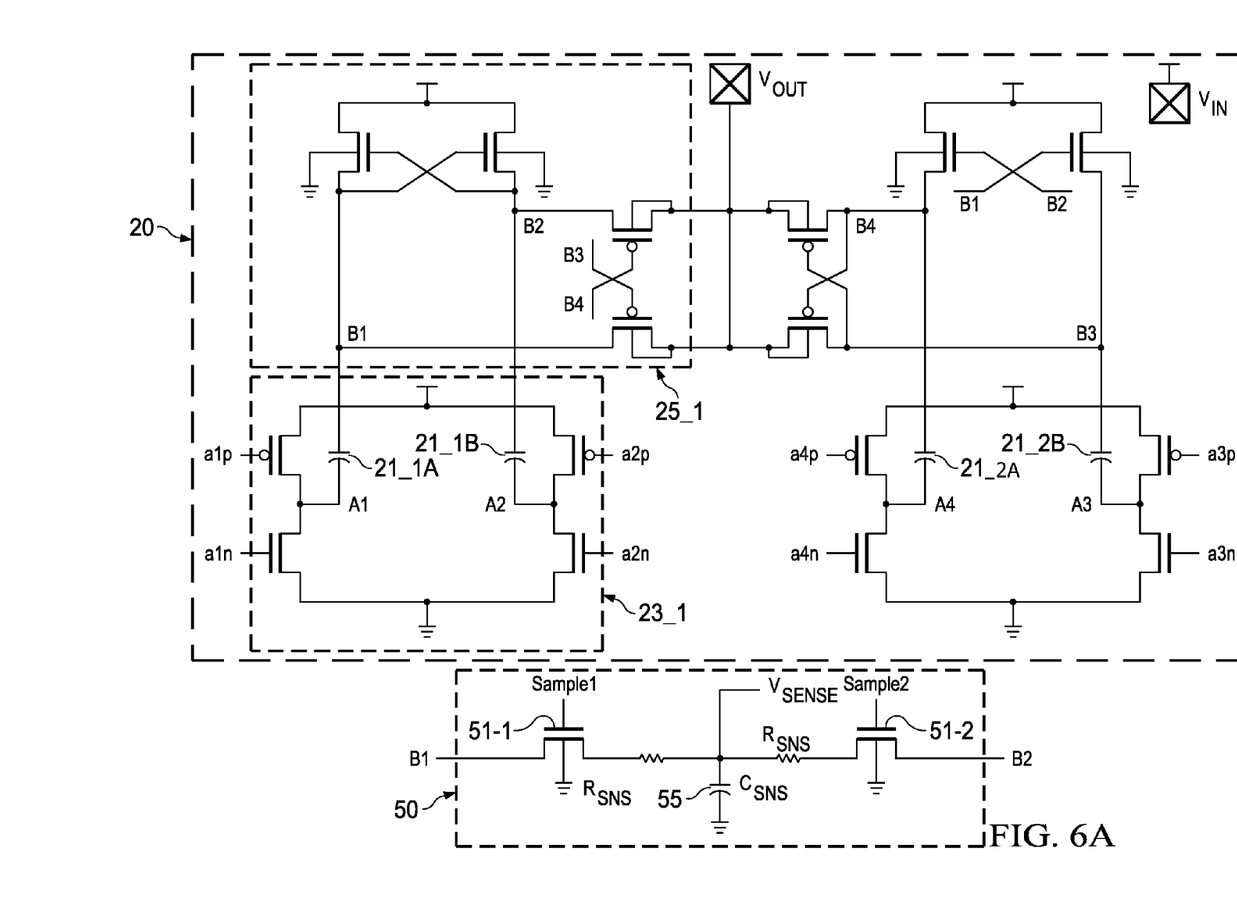
FIGS. 6A and 6B illustrate the interaction between the example dual-phase complementary differential charge pump 20, and an example Vsense circuit 50: (6A) illustrates the complementary differential charge pump and a corresponding differential Vsense circuit 50, including dual/complimentary sample transistors 51_1 and 51_2 controlled by respective sample clocks Sample1 and Sample2, and a Csns capacitor 55; and (6B) provides example timing diagrams for generating sample clock phases Sample1 and Sample2.
Figure 6B:
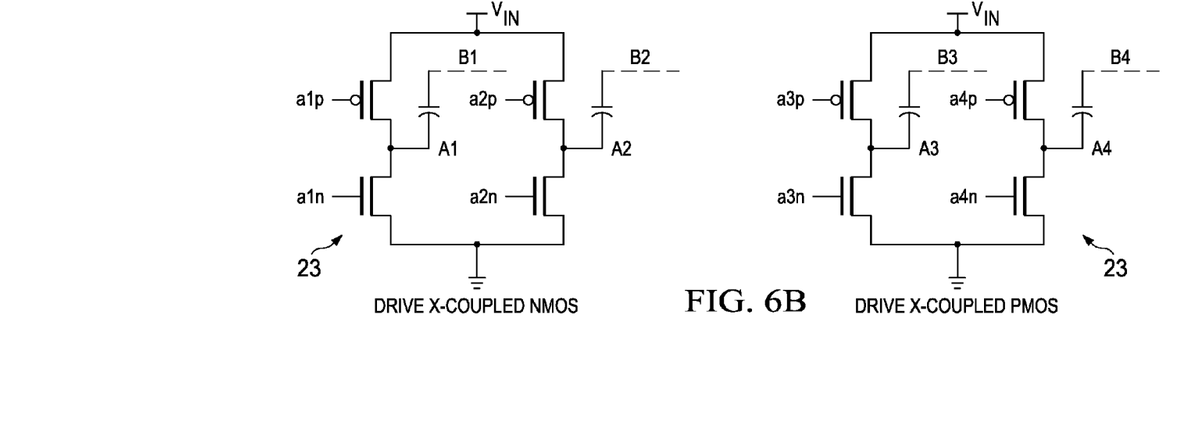

FIGS. 6A and 6B illustrate the interaction between the example dual-phase complementary differential charge pump 20, and an example Vsense circuit 50: (6A) illustrates the complementary differential charge pump 20 and a corresponding differential Vsense circuit 50, including dual sample transistors 51_1 and 51_2 controlled by respective sample clocks Sample1 and Sample2, and a Csns capacitor 55; and (6B) provides example timing diagrams for generating sample clock phases Sample1 that samples B1, and Sample2 that samples B2.

Sample transistors 51_1 and 51_2 are controlled respectively by the sample clocks Sample1 and Sample2 to sample flying capacitors 21_1A/B by connecting the top plates (nodes B1/B2) to Csns 55. Nodes B1/B2 are sampled after dual-phase clock switching network 23_1 (a1p/a1n and a2p/a2n) switches the bottom plates of flying capacitors 21_1A/1B from VIN to GND. This Vsense operation captures Vsense=VOUT−VIN on Csns 55, providing Vsense to the QPclk circuit (FIG. 1, 30).

Referring also to FIGS. 5B/5C, FIG. 6B illustrates the Sample1/Sample2 sample clock phases in connection with charge pump nodes A1/A2/A3/A4. Sample 1 samples node B1 (top plate of flying capacitor 21_1A), and Sample 2 samples node B2 (top plate of flying capacitor 21_1B).

The same operation is repeated for the complimentary flying capacitors 21_2A and 21_2B on the opposite phase. This dual-phase complementary pump/charge control ensures that the complementary dual flying capacitors 21_1A/B in differential charge pump stage 21_1, and flying capacitors 21_2A/B in differential charge pump stage 21_2, are sampled once in ever period, so that the average is the Vsense sense voltage.

Advantages of voltage sensing using the residual charge on a flying capacitor include implementing voltage sense without loading the output and without added power consumption, and blending charge pumping operations (pump/charge phases) with voltage sensing (introducing a sample phase) for an attendant reduction in die area allocated to voltage sensing.

The Disclosure provided by this Description and the Figures sets forth example embodiments and applications illustrating aspects and features of the invention, and does not limit the scope of the invention, which is defined by the claims. Known circuits, functions and operations are not described in detail to avoid obscuring the principles and features of the invention. These example embodiments and applications can be used by ordinarily skilled artisans as a basis for modifications, substitutions and alternatives to construct other embodiments, including adaptations for other applications.

The invention claimed is:

1. A charge pump power supply circuit suitable for supplying a regulated output voltage VOUT based on an input voltage VIN, comprising:
   a charge pump circuit, coupled to receive VIN and coupled to a ground potential GND, and including
      at least one flying capacitor Cfly, including a Cfly top plate and a Cfly bottom plate, and
      a QP switching network configured for controlled switching of Cfly in successive phases: a pump phase with Cfly coupled between VOUT and VIN, and a charge phase with Cfly coupled between VIN and GND; and
   QP regulation loop circuitry configured to regulate VOUT by controlling the QP switching network, including
      Vsense circuitry coupled to the QP switching network, and configured to sense VOUT and provide a corresponding Vsense voltage signal;
      QP clocking circuitry responsive to the Vsense signal corresponding to VOUT to supply a clock signal QPclk that controls the QP switching network to operate the charge pump circuit with non-overlapping charge and pump phases, and generate a regulated VOUT;
      the Vsense circuitry and the QP switching network configured for cooperative operation in a sample phase occurring after the pump phase and before the charge phase, the sample phase including:
         connecting the Cfly bottom plate to GND, and
         sampling the voltage on the Cfly top plate as the Vsense voltage corresponding to (Vsense=VOUT−VIN).

2. The circuit of claim 1, wherein the Vsense circuitry comprises:
   a sense capacitor Csns; and
   a sample transistor coupled between Csns and the Cfly top plate;
   the sample transistor controlled by a sample signal derived from QPclk that switches the sample transistor on to couple the Cfly top plate to Csns after the Cfly bottom plate is coupled to GND, such that the Vsense voltage is on Csns.

3. The circuit of claim 1, wherein the QP clocking circuitry comprises:
   time base generation circuitry responsive to a $QP_{FAST}$ selection signal to select between a FAST_clk clock and a SLOW_clk:
      FAST_clk corresponds to a burst pumping mode in which VOUT increases to regulated VOUT; and
      SLOW_clk corresponds to a maintain pumping mode in which VOUT decreases; and
   $QP_{FAST}$ generation circuitry configured to generate $QP_{FAST}$ based on Vsense:
      $QP_{FAST}$ is asserted to select FAST_clk; and
      $QP_{FAST}$ is de-asserted to select SLOW_clk.

4. The circuit of claim 3, wherein the $QP_{FAST}$ generation circuitry comprises:
   reference band circuitry that generates reference voltages $V_{QPF\_START}$ corresponding to starting FAST_clk, and $V_{QPF\_STOP}$ corresponding to stopping FAST_clk;
   reference band selection circuitry responsive to Vsense to select between $QP_{FAST}$ asserted and $QP_{FAST}$ de-asserted based on the $V_{QPF\_START}$ and $V_{QPF\_STOP}$ reference voltages.

5. The circuit of claim 1:
   wherein the charge pump circuit is configured with a dual-phase complementary differential topology, including complementary differential charge pump stages,
      each including dual differential flying capacitors Cfly, and an associated complementary differential QP switch network; and
   wherein the Vsense circuitry is configured to sample the complementary dual flying capacitors once in each QP clock period, so that the average of the samples is the Vsense sense voltage.

6. A charge pump power supply circuit suitable for supplying a regulated output voltage VOUT based on an input voltage VIN, comprising:
a differential charge pump circuit, coupled to receive VIN and coupled to a ground potential GND, and including
dual differential flying capacitors Cfly, each including a Cfly top plate and a Cfly bottom plate, and
a QP switching network configured for controlled switching of the differential Cfly capacitors in successive phases: a pump phase with Cfly coupled between VOUT and VIN, and a charge phase with Cfly coupled between VIN and GND; and
QP regulation loop circuitry configured to regulate VOUT by controlling the QP switching network, including
Vsense circuitry coupled to the QP switching network, and configured to sense VOUT and provide a corresponding Vsense voltage signal;
QP clocking circuitry responsive to the Vsense signal corresponding to VOUT to supply a clock signal QPclk that controls the QP switching network to operate the differential charge pump circuit with differential non-overlapping charge and pump phases, and generate a regulated VOUT;
the Vsense circuitry and the QP switching network configured for cooperative operation in a sample phase occurring after the pump phase and before the charge phase, the sample phase including for each differential capacitor Cfly:
connecting the Cfly bottom plate to GND, and
sampling the voltage on the Cfly top plate as the Vsense voltage corresponding to (Vsense=VOUT−VIN).

7. The circuit of claim 6, wherein the Vsense circuitry comprises:
at least one sense capacitor Csns; and
at least one sample transistor coupled between Csns and the respective Cfly top plate;
each sample transistor controlled by a respective sample signal derived from QPclk that switches the sample transistor on to couple the Cfly top plate to Csns after the Cfly bottom plate is coupled to GND, such that the Vsense voltage is on Csns.

8. The circuit of claim 6, wherein the QP clocking circuitry comprises:
time base generation circuitry responsive to a $QP_{FAST}$ selection signal to select between a FAST_clk clock and a SLOW_clk:
FAST_clk corresponds to a burst pumping mode in which VOUT increases to regulated VOUT; and
SLOW_clk corresponds to a maintain pumping mode in which VOUT decreases; and
$QP_{FAST}$ generation circuitry configured to generate $QP_{FAST}$ based on Vsense:
$QP_{FAST}$ is asserted to select FAST_clk; and
$QP_{FAST}$ is de-asserted to select SLOW_clk.

9. The circuit of claim 8, wherein the $QP_{FAST}$ generation circuitry comprises:
reference band circuitry that generates reference voltages $V_{QPF\_START}$ corresponding to starting FAST_clk, and $V_{QPF\_STOP}$ corresponding to stopping FAST_clk;
reference band selection circuitry responsive to Vsense to select between $QP_{FAST}$ asserted and $QP_{FAST}$ de-asserted based on the $V_{QPF\_START}$ and $V_{QPF\_STOP}$ reference voltages.

10. The circuit of claim 6:
wherein the differential charge pump circuit is configured with a dual-phase complementary differential topology, including
complementary differential charge pump stages,
each including dual differential flying capacitors Cfly, and an associated complementary differential QP switch network; and
wherein the Vsense circuitry is configured to sample the complementary dual flying capacitors once in each QP clock period, so that the average of the samples is the Vsense sense voltage.

11. A method of supplying a regulated output voltage VOUT based on an input voltage VIN, usable in a charge pump power supply including at least one flying capacitor Cfly, including a Cfly top plate and a Cfly bottom plate, and including a QP switching network configured for controlled switching of Cfly in successive pump and charge phases, where, in a pump phase, Cfly is coupled between VOUT and VIN, and in a charge phase, Cfly is coupled between VIN and a ground potential GND, the method comprising:
generating, based on a Vsense voltage signal corresponding to VOUT, a clock signal QPclk that controls the QP switching network to operate the charge pump power supply with non-overlapping charge and pump phases, and generate a regulated VOUT; and
generating the Vsense voltage signal corresponding to VOUT in a sample phase occurring after the pump phase and before the charge phase, the sample phase including:
connecting the Cfly bottom plate to GND, and
sampling the voltage on the Cfly top plate as the Vsense voltage corresponding to (Vsense=VOUT−VIN).

12. The method of claim 11, wherein the Vsense voltage signal is generated in a Vsense circuit that includes:
a sense capacitor Csns; and
a sample transistor coupled between Csns and the Cfly top plate;
the sample transistor controlled by a sample signal derived from QPclk that switches the sample transistor on to couple the Cfly top plate to Csns after the Cfly bottom plate is coupled to GND, such that the Vsense voltage is on Csns.

13. The method of claim 11, wherein generating the QPclk clock signal comprises:
selecting, in response to a $QP_{FAST}$ selection signal, between a FAST_clk and a SLOW_clk:
FAST_clk corresponds to a burst pumping mode in which VOUT increases to regulated VOUT; and
SLOW_clk corresponds to a maintain pumping mode in which VOUT decreases; and
generating $QP_{FAST}$ based on Vsense, such that $QP_{FAST}$ is asserted to select FAST_clk, and QPFAST is de-asserted to select SLOW_clk.

14. The method of claim 13, wherein generating $QP_{FAST}$ comprises:
generating reference band voltages $V_{QPF\_START}$ corresponding to starting FAST_clk, and $V_{QPF\_STOP}$ corresponding to stopping FAST_clk; and
selecting, in response to Vsense, between $QP_{FAST}$ asserted and $QP_{FAST}$ de-asserted based on the $V_{QPF\_START}$ and $V_{QPF\_STOP}$ reference voltages.

15. The method of claim 11:
wherein the charge pump circuit is configured with a dual-phase complementary differential topology, including
complementary differential charge pump stages, each including dual differential flying capacitors Cfly, and an associated complementary differential QP switch network; and wherein the Vsense circuitry is configured to sample the complementary dual flying capacitors once in each QP clock period, so that the average of the samples is the Vsense sense voltage.

\* \* \* \* \*